US011120200B1

(12) United States Patent
Totale et al.

(10) Patent No.: US 11,120,200 B1
(45) Date of Patent: Sep. 14, 2021

(54) CAPTURING UNSTRUCTURED INFORMATION IN APPLICATION PAGES

(71) Applicant: EMC IP Holding Company LLC, Hopkinton, MA (US)

(72) Inventors: Sachin G. Totale, Bangalore (IN); Naveen Vidyananda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 956 days.

(21) Appl. No.: 14/570,225

(22) Filed: Dec. 15, 2014

(51) Int. Cl.
*G06F 40/169* (2020.01)
*G06F 3/0484* (2013.01)

(52) U.S. Cl.
CPC ........ *G06F 40/169* (2020.01); *G06F 3/04842* (2013.01)

(58) Field of Classification Search
CPC ............. G06F 17/2241; G06F 17/2242; G06F 17/2247; G06F 17/2288; G06F 40/169; G06F 3/04842
See application file for complete search history.

(56) References Cited

U.S. PATENT DOCUMENTS

| 7,783,980 B1* | 8/2010 | Herold ................. G06Q 10/107 715/740 |
| 8,501,646 B2* | 8/2013 | Motomura .......... A61F 13/4902 442/329 |
| 2003/0081000 A1* | 5/2003 | Watanabe ............. G06F 17/241 715/751 |
| 2003/0204490 A1* | 10/2003 | Kasriel .................. G06Q 10/10 |
| 2005/0160356 A1* | 7/2005 | Albornoz .............. G06F 17/241 715/229 |
| 2006/0265640 A1* | 11/2006 | Albornoz ............ G06F 17/2247 715/234 |
| 2008/0066185 A1* | 3/2008 | Lester ..................... G06F 21/10 726/27 |
| 2011/0113320 A1* | 5/2011 | Neff ........................ G06Q 10/10 715/230 |
| 2012/0284646 A1* | 11/2012 | Sitrick .................... G06Q 10/10 715/753 |
| 2013/0219280 A1* | 8/2013 | Weinstein ............... H04L 67/14 715/736 |
| 2014/0115436 A1* | 4/2014 | Beaver ................ G06F 17/2288 715/229 |

* cited by examiner

*Primary Examiner* — Thu V Huynh
(74) *Attorney, Agent, or Firm* — Krishnendu Gupta; Nikhil Patel

(57) ABSTRACT

Capturing unstructured information in application pages is disclosed, including: receiving via an application composition interface a selection to add an annotation capability to an element associated with a page, wherein the page is associated with an application that is being defined at least in part via the application composition interface; storing an application definition for the application, wherein the application definition includes for the page a page definition data that reflects the selection; and generating application code for the application programmatically, based at least in part on the application definition, wherein the application code is configured to include in the page as displayed to an end user of the application an ability for the end user to input annotation data to be associated with the element.

28 Claims, 12 Drawing Sheets

FIG. 5

Application Runtime User Interface – End User A

Page Editor

Loan Application Form

Full Name [ Alice Jones ] ▨ — 702

Social Security Number [ 555 - 55 - 5555 ]

Mailing Address [ 1234 Sesame Street ]
[ Cupertino CA 95014 ]

Loan Type  ● Business  ○ Personal

Credit Score [ 704 ] ▨ — 704

Loan Amount [▽ $200,000 ]

( Submit )

FIG. 7

Application Runtime User Interface – End User A

FIG. 8

| Annotation Text | Annotation ID | Object ID | Element ID | User ID | Public? | Permission Set |
|---|---|---|---|---|---|---|
| "This credit score does not reflect my latest financial circumstances. I will send an updated credit score report as soon as possible." | 1234 | App_32 | P4_3 | A_Jones3 | No | Customer: Read, Write; Reviewer: Read, Write Manager: Read, Write, Delete |
| "This is my landline phone number and I only use it after work hours." | 45345 | App_64 | P1_2 | K_Wright | No | Customer: Read, Write; Reviewer: Read, Write Manager: Read, Write, Delete |
| ... | ... | ... | ... | ... | ... | ... |

FIG. 9

Application Runtime User Interface – End User B

Page Editor

Loan Application Form

Full Name: Alice Jones

Social Security Number: 555 - 55 - 5555

Mailing Address: 1234 Sesame Street
Cupertino CA 95014

Loan Type: ● Business  ○ Personal      1202
                                        1204

Credit Score: 704

End User A:
This credit score does not reflect my latest financial circumstances. I will send an updated credit score report as soon as possible.

Loan Amount: ▼ $200,000

Submit

FIG. 12

CAPTURING UNSTRUCTURED INFORMATION IN APPLICATION PAGES

BACKGROUND OF THE TECHNOLOGY

Users in various organizations actively use annotation and/or notes on paper forms to communicate additional data or comments for a form through various techniques. Examples of such techniques include directly writing on the form, marking at least a portion of the form with a colored marker, and/or attaching notes or stickers to the form. This annotation information is captured so that it can be referred to later and/or is also used as a way to convey some information to the next person (e.g., a reviewer) who will review the form.

However in web-based forms, such annotation capabilities are generally not available. Instead, the user of the application may end up conveying all annotation information in a general comments section associated with a web-based form.

Enabling comments to be associated with an entire web-based form might be suitable for simple forms that include only a few fields. However, in most business scenarios, web-based forms are rich in content and may have several input fields spread across sections (e.g., across several tabs, steps, pages, etc.).

BRIEF DESCRIPTION OF THE DRAWINGS

Various embodiments of the technology are disclosed in the following detailed description and the accompanying drawings.

FIG. 5 is a diagram illustrating an example application graphical composition user interface in an example embodiment of a system for capturing unstructured information in application pages.

FIG. 7 is a diagram illustrating an example application runtime user interface in an example embodiment of a system for capturing unstructured information in application pages.

FIG. 8 is a diagram illustrating an example application runtime user interface in an example embodiment of a system for capturing unstructured information in application pages.

FIG. 9 is a diagram illustrating an example of a table that is used to store annotation data in an example embodiment of a system for capturing unstructured information in application pages.

FIG. 12 is a diagram illustrating an example application runtime user interface in an example embodiment of a system for capturing unstructured information in application pages.

DETAILED DESCRIPTION

Figure 1:
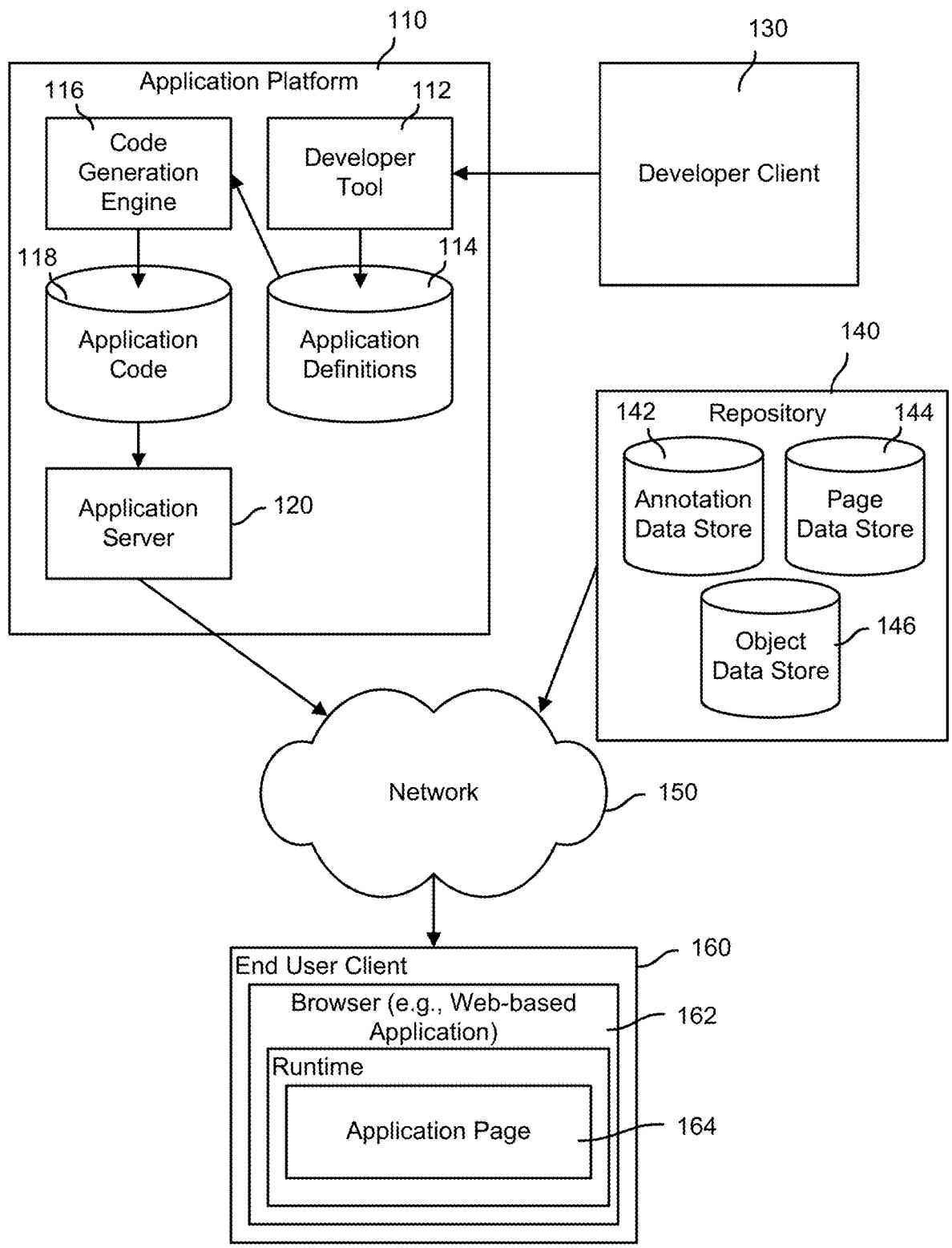
FIG. 1 is a block diagram illustrating an example embodiment of an environment for capturing unstructured information in application pages.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the technology may take, may be referred to as techniques. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the principles of the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details. For the purpose of clarity, technical material that is known in the technical fields related to the technology has not been described in detail so that the technology is not unnecessarily obscured.

Embodiments of capturing unstructured information in application pages are described herein. In various embodiments, an application (e.g., developed by a user associated with an enterprise) is defined, built, and deployed. The application may be defined using a developer tool that is configured to provide a user with predefined patterns, components, services, for example, that the user may use to define the application and/or the deployment thereof. In various embodiments, a page to be used in the application is defined. In some embodiments, the page comprises a form. The page is defined to include one or more elements. In various embodiments, an "element" comprises an input field, a selection, a widget, a button, and/or an action. In various embodiments, a selection to add an annotation capability property with respect to an element of a page of an application is received via a composition interface of the developer tool during design time. In some embodiments, the annotation capability with respect to the element includes one or more annotation attributes. An example of an annotation attribute comprises a control access permission set associated with one or more end user roles, in which each user role is defined to possess one or more control access permission types (e.g., read, write, or delete) associated with the annotation data with respect to that element during runtime of the application. The annotation capability property for the element is stored as part of the definition of the application. In various embodiments, application code is generated for the application defined in the developer tool. The application code can be executed to deploy the application for an end user. Due to the selection of adding the annotation capability to the element of the page, the generated application code is configured to include in the page as displayed to the end user the ability for the end user of the application to input annotation data to be associated with that element.

FIG. 1 is a block diagram illustrating an example embodiment of an environment for capturing unstructured information in application pages. Application platform 110 is configured to enable a developer user to define an application (e.g., via a composition interface), generate application code for the defined application, and deploy the application for an end user to use (e.g., using a web browser). Application platform 110 includes developer tool 112, application definitions 114, code generation engine 116, application code 118, and application server 120.

As shown in the example, application platform 110 is connected to developer client 130. While not shown in the example, application platform 110 may be connected to developer client 130 via network 150, e.g., the Internet. In various embodiments, developer tool 112 is configured to enable a developer user (e.g., associated with an enterprise) using developer client 130 to create an (e.g., enterprise) application. For example, developer client 130 comprises a computer, mobile device, or any other computing device with a user interface. Examples of an enterprise application include an insurance claim processing application, a loan application processing application, and a credit dispute resolution application. Portions of an enterprise application may be used by users internal to the enterprise (e.g., employees of the enterprise) and portions of the enterprise application may be used by users external to the enterprise (e.g., customers of the enterprise). For example, a customer of an insurance company may use the insurance claim processing application to submit a new claim and then an employee (e.g., customer representative or claims adjuster) of the insurance company may use the application to review the content of the claim against the policy taken out by the customer. In some embodiments, developer tool 112 provides a (e.g., web-based) graphical composition tool at a user interface of developer client 130 that enables a developer user to compose/define an application using predefined patterns, components, services, templates, libraries, and rules, for example. For example, a definition of an application may comprise a data model. A definition of an application may include selections of predefined content, defined relationships between different components, values submitted to correspond to selected attributes, a user interface, a form, a menu, an integration to a third party service, a login page, and a search feature, for example.

As will be described in further detail below, a definition of an application may also include the addition of an annotation capability property with respect to each of at least some elements of a page of the application. In some embodiments, an application is defined to include one or more pages in which an end user of the application may input information. For example, a page may include a form with one or more elements in which information may be input or selected. A developer user may use the graphical composition tool of developer 112 to add an annotation capability to each of one or more elements of a page of an application. In some embodiments, the developer user can also add one or more annotation attributes to be associated with an annotation capability that is added to an element of an application page. An element to which an annotation capability is added is sometimes referred to as an "annotation capable" element. For example, the one or more annotation attributes associated with an annotation capability of an element of an application page may comprise a control access permission set with respect to each of various end user roles with respect to the application. For example, different end users associated with different user roles may interact with a page of an application and may each be assigned different control access permissions with respect to the annotation capability that has been configured for each of at least a subset of elements of the page. In the example where the application is configured for loan application processing, a first end user role (e.g., the loan applicant) may have the control access permission to read and write annotation data to a page with a loan application form while a second end user role (e.g., a loan officer) who is to review the loan application form that was completed by the first end user may have control access permission to read, write, and also delete the annotation data submitted by the first end user. In some embodiments, the graphical composition tool of developer tool 112 may allow a user to drag and drop predefined content at the user interface to enable a developer user with little to no computer programming experience to define an application. An example of the graphical tool is the EMC Documentum xCP software. Developer tool 112 is configured to store the definition of each application at application definitions 114 of application platform 110. For example, application definitions 114 comprise a storage or database for definitions of applications.

Code generation engine 116 of application platform 110 is configured to obtain a definition of an application from application definitions 114 and generate application code based on the definition. Code generation engine 116 then stores the generated application code corresponding to an application at application code 118 of application platform 110. For example, application code 118 comprises a storage or database for application code.

As shown in the example, application platform 110 is connected to end user client 160 over network 150. Application server 120 of application platform 110 is configured to deploy application code associated with an application from application code 118 for an end user of the application using end user client 160. As shown in the example, the application may be a web-based application and therefore an object instance of the application can be executed for the end user of end user client 160 in an environment associated with browser 162. The end user using end user client 160 is able to view application page 164 in the object instance of the application in browser 162. Application page 164 may include one or more elements into which end user of end user client 160 can input information. For example, application page 164 is rendered using hypertext markup language (HTML) and includes a form with one or more elements. For example, application page 164 comprises a page of a loan application that is being completed by an end user who wishes to apply for a loan. In some embodiments, each element of application page 164 for which the developer user had added an annotation capability during the definition (e.g., design time) of the application is presented with a visual indication (e.g., an icon) associated with the annotation capability. The end user may select the visual indication associated with the annotation capability corresponding to an element of application page 164 to input/write annotation data to be stored corresponding to that element of page 164 with respect to an object instance of application page 164 associated with that end user. For example, the end user may input annotation data corresponding to an element (e.g., form field) that provides more context to the information that the end user had submitted in the element. In various embodiments, an end user can optionally input annotation or unstructured data corresponding to elements of an application page for which the annotation capability was defined during the definition of the application. In various embodiments, the annotation data may include rich text and/or images.

In some embodiments, an end user role associated with an end user and one or more annotation attributes (e.g., a control access permission set determined for that end user role) associated with an annotation capability defined for an element of application page 164 may determine whether or not that end user using end user client 160 can view the visual indication associated with the annotation capability and if so, whether or not that end user can write/input annotation data corresponding to that element. In some embodiments, a first user role associated with a first end user and one or more annotation attributes (e.g., a control access permission set determined for the first end user role) associated with an annotation capability defined for an element of application page 164 may determine whether or not the first end user using end user client 160 can read, modify (e.g., write), and/or delete the annotation data that was saved with the element by a second end user.

As shown in the example, end user client 160 is connected to repository 140 over network 150. In various embodiments, data associated with the object instance of the application presented at end user client 160, the data input into the elements of an application page such as application page 164, and the annotation data input with respect to those elements of the application page for which the annotation capability was defined/added are stored at repository 140. In some embodiments, the annotation data saved corresponding to an element for which the annotation capability had been defined is stored separately from both the data input into the element and the data associated with the object instance of the application. As shown in the example, the annotation data, the object data, and the page data (e.g., data input into elements of application pages) may be stored in separate data stores, annotation data store 142, object data store 146, and page data store 144, respectively. Each set of annotation data at annotation data store 142 is stored with a set of metadata that can be used to associate it with a particular application page, a particular object instance of the application, a particular element of the application page, a particular end user, and configured control access permission set for each end user role, for example. By storing the annotation data separately from other page data and application object instance data, the annotation data can be queried independently from the other related data.

Figure 2:
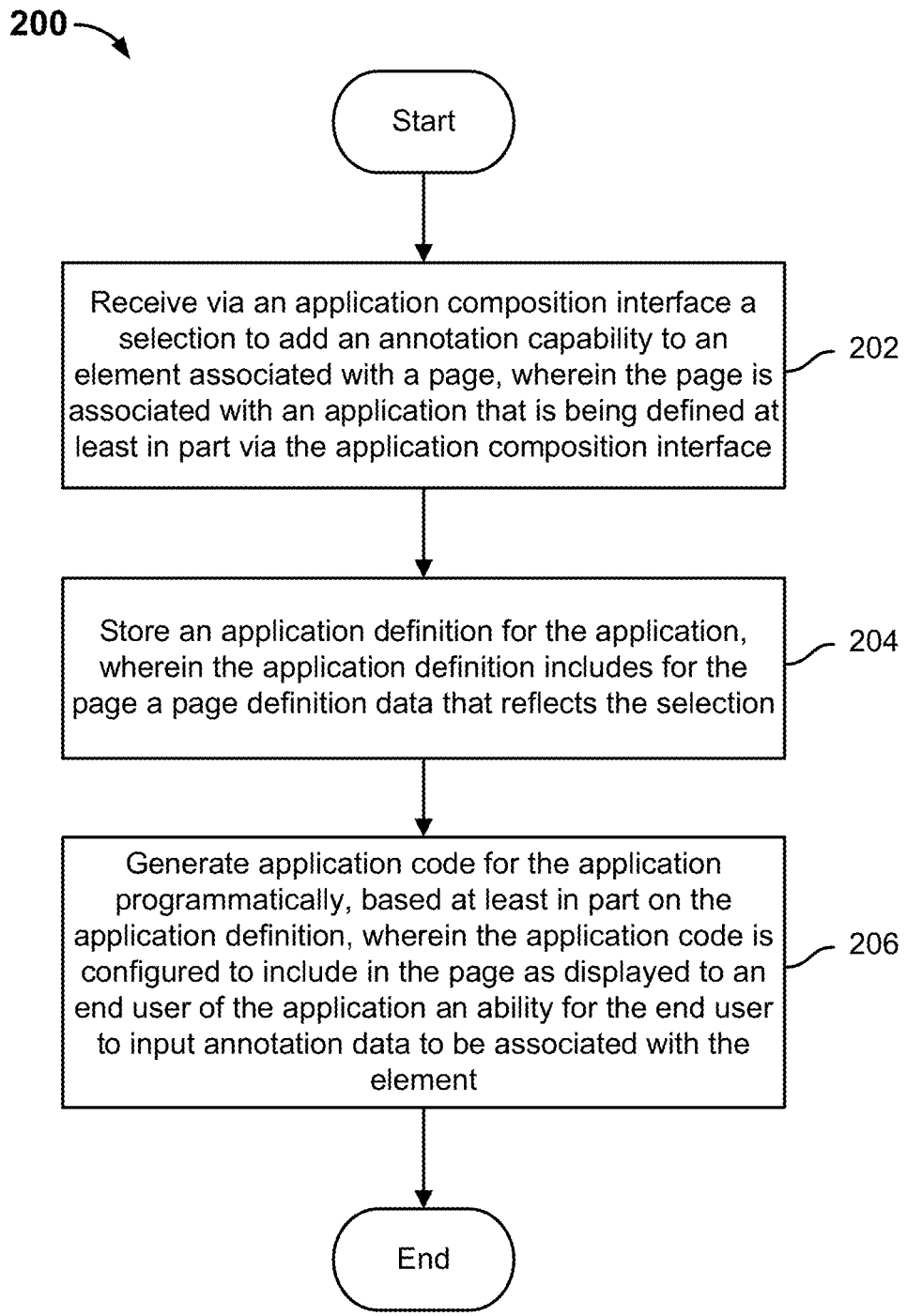
FIG. 2 is a flow chart illustrating an example embodiment of a process to capture unstructured information in an application page.

FIG. 2 is a flow chart illustrating an example embodiment of a process to capture unstructured information in an application page. In various embodiments, application platform 110 of FIG. 1 may be configured to implement process 200 of FIG. 2.

At 202, a selection to add an annotation capability to an element associated with a page is received via an application composition interface, wherein the page is associated with an application that is being defined at least in part via the application composition interface. In various embodiments, a composition interface associated with a developer tool is presented to a developer user to define an application during design time. For example, the composition interface comprises a graphical composition interface in which the developer user may drag and drop and/or otherwise add predefined content at the user interface to define the application. An annotation capability property with respect to each of one or more elements at an application page can be added by the developer user at the composition interface. In some embodiments, the application page comprises a form in which data is submitted through one or more elements. For example, a user may add an annotation capability to none of the elements of an application page, to each of a subset of the elements of the application page, and/or to each element of the application page. In some embodiments, an element of an application code for which an annotation capability is not added will not be able to receive annotation data.

In some embodiments, one or more annotation attributes are also defined for the annotation capability that is added to an element of an application page. For example, the annotation attributes defined for the annotation capability that is added to an element of an application page may comprise a set of control access permissions configured for various end user roles with respect to accessing the annotation data associated with the application page.

In some embodiments, the annotation capability property comprises a group annotation capability that can be applied at a container level of the application page. For example, the container may include multiple page elements with which the group annotation capability can be defined. In some embodiments, adding annotation capability to each of various elements of a page allows each end user (e.g., with the appropriate permissions) to customize the application page.

At 204, an application definition is stored for the application, wherein the application definition includes for the page a page definition that reflects the selection. The application definition will include a page definition for the page for which the selection to add the annotation capability to an element was received, data that describes the selected annotation capability with respect to that element.

At 206, application code is generated for the application programmatically, based at least in part on the application definition, wherein the application code is configured to include in the page as displayed to an end user of the application an ability for the end user to input annotation data to be associated with the element. The definition associated with the application is stored and used to programmatically generate application code for the application. The application code is executed to run an object instance of the application for an end user of the application. During runtime, the executed application code is configured to present the page such that each element for which an annotation capability was defined/added during the definition of the application is presented with a visual indication of its corresponding annotation capability. For example, an icon indicating the availability to input annotation data may be presented next to an element for which an annotation capability was defined during design time of the application. The end user may select the visual indication associated with the annotation capability of an element at an application page to input annotation data to be stored with respect to that element. For example, annotation data my include text and/or images.

Figure 3:
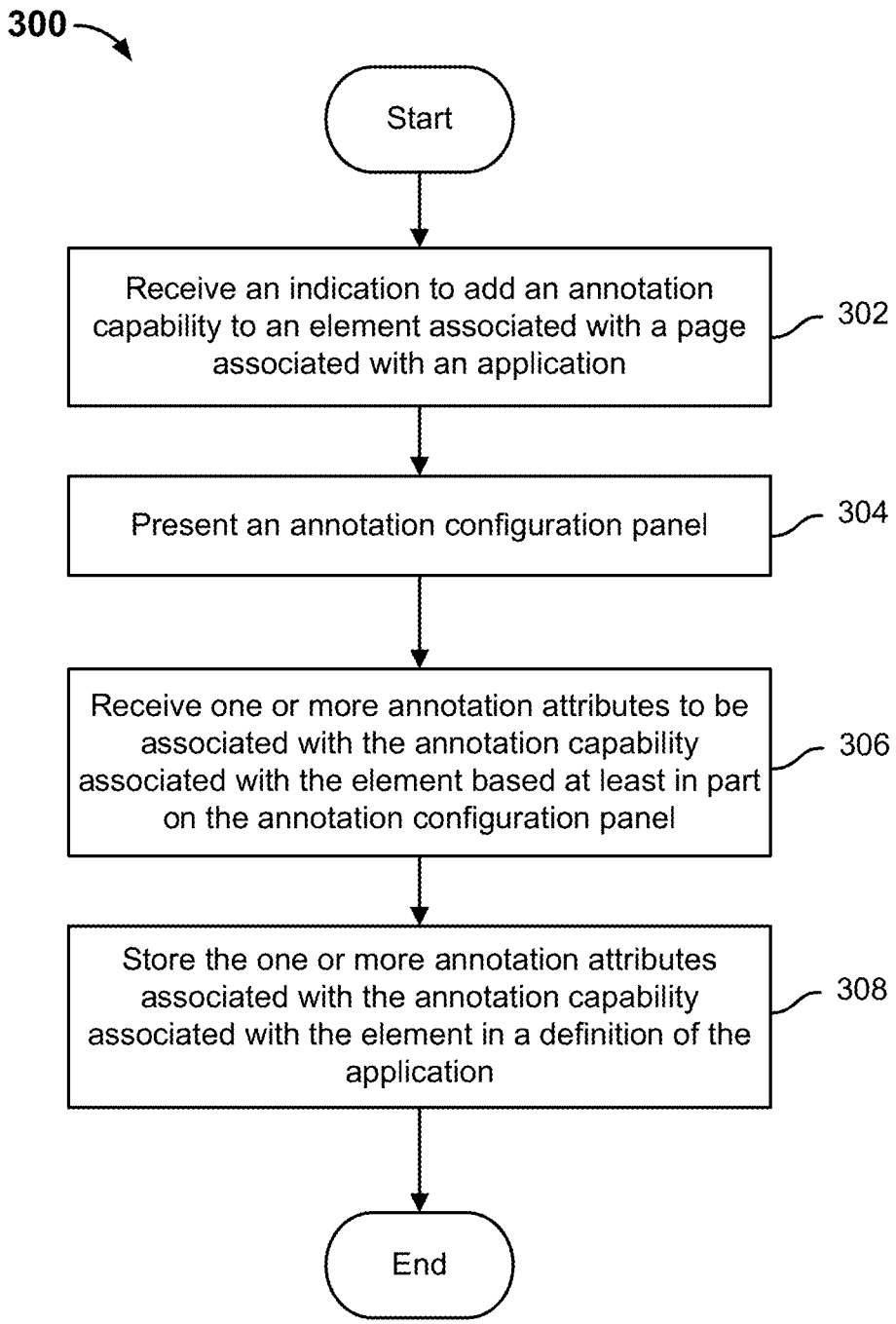
FIG. 3 is a flow chart illustrating an example embodiment for a process to define an annotation capability associated with an element in an application page.

FIG. 3 is a flow chart illustrating an example embodiment for a process to define an annotation capability associated with an element in an application page. In various embodiments, application platform 110 of FIG. 1 may be configured to implement process 300 of FIG. 3. In some embodiments, specifically, developer tool 112 of application platform 110 of FIG. 1 may be configured to implement process 300 of FIG. 3.

Process 300 describes an example process of defining annotation capability associated with an element in an application page during design time.

At 302, an indication to add an annotation capability to an element associated with a page associated with an application is received. During the definition of a page to be used in an application, a developer tool may add an annotation capability to each of one or more elements of the page to enable the submission of annotation data during runtime of the application for each of these one or more elements. In some embodiments, the application is being defined via a graphical composition interface in which the developer user can add an annotation capability to an element by placing a pattern associated with an annotation capability to be in the vicinity to a pattern of an element that is shown at the interface.

At 304, an annotation configuration panel is presented. In response to adding the annotation capability to the element of the page, an annotation configuration panel may be presented. In some embodiments, where the application is being defined in the graphical composition interface, in response to the placing the pattern associated with the annotation capability to be in the vicinity to the pattern of the element, an annotation configuration panel comprising a menu for configuring annotation attributes to be associated with the annotation capability of that element is presented. For example, the annotation configuration panel may include an option to configure a corresponding control access permission set for each of various different end user roles that may interact with the application page during runtime.

In some embodiments, one or more of the following permission types may be configured to an end user role: read, write, and delete. In some embodiments, the permission types are hierarchical whereby delete is the highest permission, write is the second highest permission, and read is the lowest permission. For example, a user role with a higher level of access may be assigned one or more higher permissions (e.g., delete) and a user role with a lower level of access may be assigned one or more lower permissions (e.g., read). In some embodiments, a read permission enables an end user to view the visual indications associated with elements for which annotation capabilities have been defined and also read the annotation data that has been stored with respect to those elements. In some embodiments, a write permission enables an end user to update a previously stored/existing set of annotation data associated with an annotation capable element and also to create a new set of annotation data with respect to an annotation capable element. In some embodiments, a delete permission enables an end user to delete a previously stored/existing set of annotation data associated with an annotation capable element and also to move a previously stored/existing set of annotation data that was associated with a first annotation capable element to instead be associated with a second annotation capable element.

At 306, one or more annotation attributes to be associated with the annotation capability associated with the element are received based at least in part on the annotation configuration panel. The annotation attributes configured by the developer user over the annotation configuration panel can be received. For example, the annotation attributes associated with the annotation capability of an element may include control access permissions that determine whether a first end user of the application can read, write, and/or delete the annotation data associated with that element, whether a second end user of the application can read, write, and/or delete the annotation data associated with that element, and so forth. For example, a first end user role may be configured to have only a read and write permission with respect to the annotation data associated with the element while a second end user role may be configured to only read, write, and also delete the annotation data associated with the element.

Figure 4:
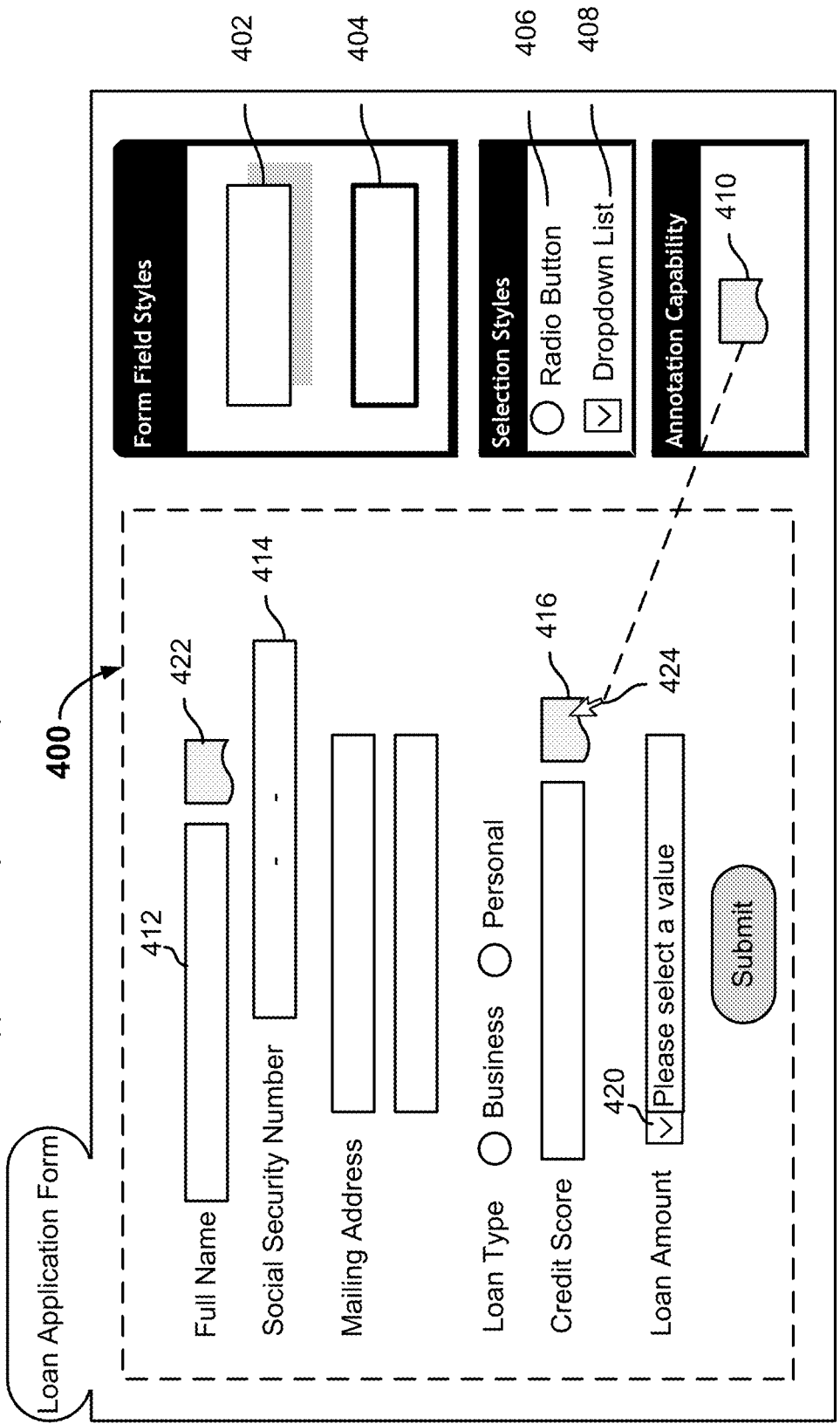
FIG. 4 is a diagram illustrating an example application graphical composition user interface in an example embodiment of a system for capturing unstructured information in application pages.

At 308, the one or more annotation attributes associated with the annotation capability associated with the element are stored in a definition of the application. The annotation capability and any configured annotation attributes associated with the element are stored in the definition of the application. As described above, application code for the application will be generated based on the definition of the application and therefore be configured to allow an end user to see a capability to submit annotation data with respect to the element of the page during runtime of the application FIG. 4 is a diagram illustrating an example application graphical composition user interface in an example embodiment of a system for capturing unstructured information in application pages. In various embodiments, developer tool 112 of application platform 110 of FIG. 1 may be configured to present an application graphical composition user interface, such as the one shown in FIG. 4. In some embodiments, at least a portion of process 300 of FIG. 3 is implemented using an application graphical composition user interface, such as the one shown in FIG. 4. The application graphical composition user interface of FIG. 4 can be used by a developer user to define an application during design time. In some embodiments, the application graphical composition user interface of FIG. 4 is web-based and can be accessed by the developer user at a developer client, such as developer client 130 of FIG. 1, over a network. As shown in the example, the application graphical composition user interface includes some predetermined content/patterns (e.g., 402, 404, 406, 408, and 410) that a user can, using cursor 424, to select and drag onto workspace 400 on the left side of the interface. The predetermined content/patterns as shown in FIG. 4 are merely examples and any type of predetermined content/patterns may be included in an application graphical composition user interface in actual practice. As shown in the example, a loan application form page is currently being defined at the application graphical composition user interface for a loan application processing application. The developer user has defined the loan application form page by adding form fields onto workspace 400 such as by dragging a form field associated with style 404 from the "Form Field Styles" menu to create the "Full Name" and "Social Security Number" (among other) fields. The developer user has also dragged a selection associated with a radio button style 406 from the "Selection Styles" menu to create the "Business" and "Personal" selections for the "Loan Type" field. The developer user has dragged a selection associated with a dropdown list style 408 from the "Selection Styles" menu to create selection list 420 associated with the "Loan Amount" field.

Figure 5:
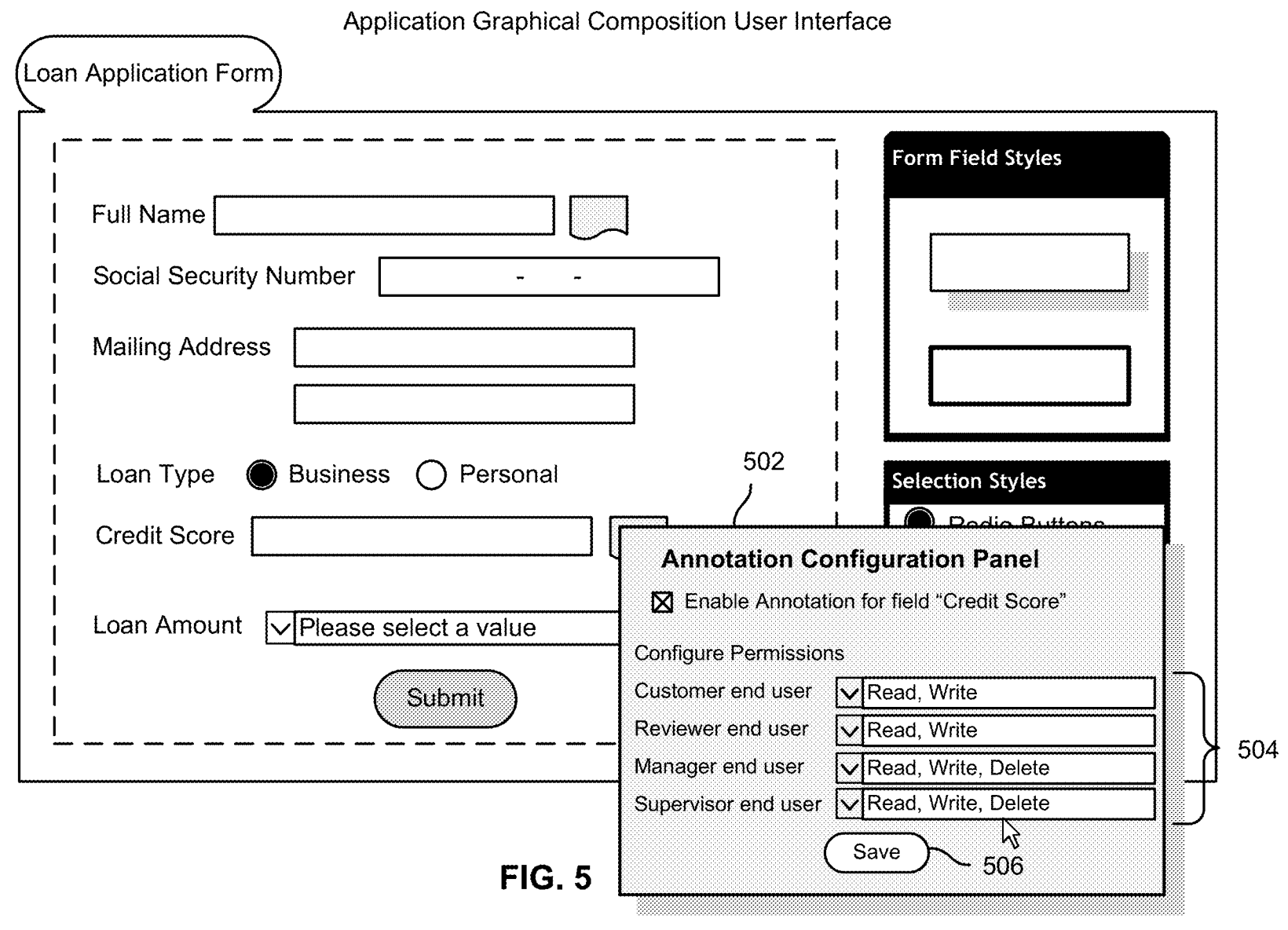

Each of the fields or selections of the loan application form in workspace 400 may be referred to as an element of the loan application form. For example, the developer user may add the annotation capability to whichever elements that the developer user thinks that end users may wish to submit unstructured annotation information with respect to. For example, the ability to submit annotation data for an element provides the end user the opportunity to provide context for the information that the end user had provided in the element and/or provide additional, unsolicited information to be associated with the element. For example, as shown in the example, each of "Full Name" field 412 comprises an element, "Social Security Number" field 414 comprises an element, the "Mailing Address" field, the "Loan Type" field, the "Credit Score" field, and "Loan Amount" field 420 comprises an element. In various embodiments, the developer user may add an annotation capability to each of one or more elements of an application page. In the example of the application graphical composition user interface, the developer may add an annotation capability to an element of the loan application form by selecting annotation capability icon 410 from the "Annotation Capability" menu and placing it next to an element to which the developer user wishes to add the annotation capability. As shown in the example, the user has already added annotation capability icon 422 next to the "Full Name" field and is currently placing annotation capability icon 416 next to the "Credit Score" field. FIG. 5, below, describes an example in which after the developer user has placed annotation capability icon 416 next to the "Credit Score" field, an annotation configuration panel is presented at the application graphical composition user interface that enables the developer user to configure one or more annotation attributes associated with the annotation capability associated with the "Credit Score" field.

FIG. 5 is a diagram illustrating an example application graphical composition user interface in an example embodiment of a system for capturing unstructured information in application pages. In various embodiments, developer tool 112 of application platform 110 of FIG. 1 may be configured to present an application graphical composition user interface, such as the one shown in FIG. 5. In some embodiments, at least a portion of process 300 of FIG. 3 is implemented using an application graphical composition user interface, such as the one shown in FIG. 5. The application graphical composition user interface of FIG. 5 is presented in response to the placement of an annotation capability icon next to the "Credit Score" field (e.g., as shown in FIG. 4). In response to the placement of an annotation capability icon next to the "Credit Score" field, annotation configuration panel 502 is presented. In the example of FIG. 5, annotation configuration panel 502 is presented as a menu/interface that overlays the application graphical composition user interface. The developer user may make selections at annotation configuration panel 502 to confirm enabling the annotation capability for the "Credit Score" field and, optionally, to configure a set of annotation attributes to be associated with the annotation capability of the "Credit Score" field. As shown in the example, the developer user can confirm the annotation capability to the "Credit Score" field by checking the checkbox next to "Enable Annotation for field 'Credit Score'" in annotation configuration panel 502. The developer user can also configure a set of annotation attributes to be associated with the annotation capability of the "Credit Score" field including by configuring a set of control access permissions to be assigned to each of various end user roles with respect to the annotation data associated with the "Credit Score" field in section 504 of annotation configuration panel 502.

The annotation attributes as shown in the annotation configuration panel of FIG. 5 are merely examples and any type of annotation attribute may be included in an annotation configuration panel in actual practice. In the example, the different end user roles include "customer end user," "reviewer end user," "manager end user," and "supervisor end user." For each end user role, the developer user can configure one or more control access permissions with respect to the annotation capability associated with the "Credit Score" field by using the corresponding dropdown menu. As shown in the example, the "customer end user" and the "reviewer end user" are each configured to have the read and write permissions. Also, the "manager end user" and the "supervisor end user" are each configured to have the read, write, and delete permissions. In the context of a loan application processing application, the "customer end user" may comprise a loan applicant that is to complete the loan application form, the "reviewer end user" may comprise a loan officer who is to review the loan application form that was completed by the loan applicant, the "manager end user" may comprise a manager of the loan officer who is to check the loan application form that was reviewed by the loan officer, and the "supervisor end user" may comprise a supervisor who may audit the checked loan applications. For example, the loan applicant may wish to write annotation data to explain the context of the information that he has input in the corresponding annotation capable element to the subsequent reviewers of the loan application form and the reviewers of the loan application form can review the loan applicant's annotation data to better understand his circumstances. The reviewers of the loan application form may also want to pass information among each other or back to the loan applicant via writing annotation data corresponding to the annotation capable elements of the loan application form. After the developer user is done configuring the one or more annotation attributes with respect to the annotation capability associated with the "Credit Score" field, the developer user may select "Save" button 506 to store the annotation attributes with respect to the annotation capability associated with the "Credit Score" field in the definition of the loan application processing application.

Figure 6:
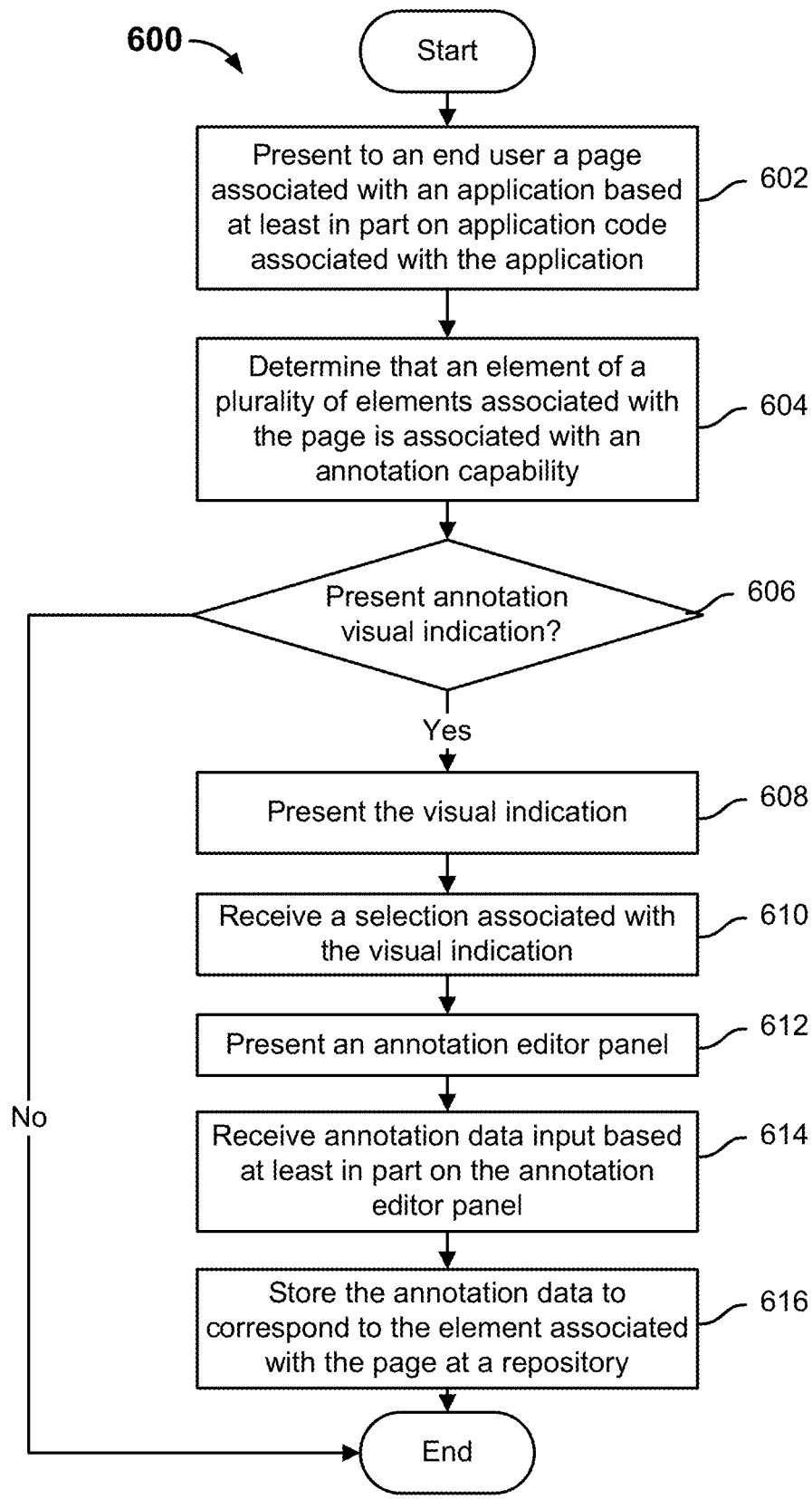
FIG. 6 is a flow chart illustrating an example embodiment for a process to receive annotation data associated with an element in an application page.

FIG. 6 is a flow chart illustrating an example embodiment for a process to receive annotation data associated with an element in an application page. In various embodiments, application platform 110 of FIG. 1 may be configured to implement process 600 of FIG. 6. In some embodiments, specifically, application server 120 of application platform 110 of FIG. 1 may be configured to implement process 600 of FIG. 6. In some embodiments, end user client 160 of FIG. 1 may be configured to implement process 600 of FIG. 6.

Process 600 describes an example process of receiving, at runtime of an application, annotation data with respect to an element in a page of the application page for which an annotation capability was defined. During runtime, the application code is executed to run an object instance of the application.

At 602, a page associated with an application is presented to an end user based at least in part on application code associated with the application. In some embodiments, the application was defined based at least in part on a developer tool such as developer tool 112 of FIG. 1. The end user of the application may be directed to a particular page of the application. In some embodiments, the page comprises a form that is presented for the end user.

At 604, it is determined that an element of a plurality of elements associated with the page is associated with an annotation capability. The application page may include one or more elements and some of such elements may each have been defined to be associated with an annotation capability (e.g., during the definition/design of the application at design time).

At 606, it is determined whether a visual indication associated with an annotation capability associated with the element is to be presented to the end user. In the event that the visual indication associated with the annotation capability associated with the element is to be presented to the end user, control is transferred to 608. Otherwise, in the event that the visual indication associated with the annotation capability associated with the element is not to be presented to the end user, process 600 ends. As described above, the annotation capability that is added to an element of a page may be configured with one or more annotation attributes. An example of an annotation attribute is control access permissions with respect to various end user roles. The role of an end user may be determined based on the end user's account information and/or login credentials. In the event that the role of the end user for which the application page is being presented does have the control access permission to read (or write) annotation data, then a visual indication that shows that an element is associated with the annotation capability is presented to the end user so that the end user may be informed that the element is one for which he or she can submit annotation data. Otherwise, in the event that the role of the end user for which the application page is being presented does not have the control access permission to read (or write) annotation data, then a visual indication that shows that an element is associated with the annotation capability is not presented to (i.e., hidden from) the end user because the end user does not have the ability to input annotation data with respect to that element.

In some embodiments, the same end user role may be configured to have different permissions with respect to the annotation capability of different elements at the same page. So potentially, the end user may see, at a page, a visual indication associated with the annotation capability next to a first element for which he or she does have permission to read and write annotation data and not see, at the same page, a visual indication associated with the annotation capability next to a second element for which he or she does not have permission to read or write annotation data.

At 608, the visual indication is presented. The visual indication associated with the annotation capability is presented to the end user near the element for which the annotation capability has been defined. For example, the visual indication comprises an icon.

At 610, a selection associated with the visual indication is received. To write annotation data with respect to the element, the end user may select (e.g., click on) the corresponding visual indication associated with the annotation capability.

At 612, an annotation editor panel is presented. In some embodiments, in response to the end user's selection of the visual indication associated with the annotation capability corresponding to the element, an annotation editor panel is presented.

At 614, annotation data input based at least in part on the annotation editor panel is received. The annotation editor panel comprises an editor in which the end user may submit the annotation data. In some embodiments, submitted annotation data may include rich text, images, and or other content.

At 616, the annotation data is stored to correspond to the element associated with the page at a repository. The annotation data submitted with respect to the element is stored at a repository. In some embodiments, the annotation data is stored at the repository in a data store that is separate from another data store at the repository that is configured to store data associated with data that is input into the elements of the page (e.g., page data). In some embodiments, the annotation data is stored at the repository in a data store that is separate from another data store at the repository that is configured to store data associated with the application object instance. Each set of annotation data is stored with a set of metadata that can be used to identify at least the associated application page, the element of the application page, and/or the end user. By storing the annotation data separately from other types of data, the annotation data may be easier to maintain and/or searched through.

FIG. 7 is a diagram illustrating an example application runtime user interface in an example embodiment of a system for capturing unstructured information in application pages. In various embodiments, application server 120 of application platform 110 of FIG. 1 may be configured to present an application runtime user interface, such as the one shown in FIG. 7. In some embodiments, at least a portion of process 600 of FIG. 6 is implemented using an application runtime user interface, such as the one shown in FIG. 7. The application runtime user interface of FIG. 7 can be generated by at least executing the application code generated based on the definition of the application. The application runtime user interface is used by an end user to use an object instance of an application during runtime. In some embodiments, the application runtime user interface of FIG. 7 is web-based and can be accessed by the end user at an end user client, such as end user client 160 of FIG. 1, over a network. For example, application page 164 presented in browser 162 at end user client 160 of FIG. 1 may be implemented using the example of FIG. 7. The example application page of FIG. 7 is presented to End User A. In the example, End User A comprises a loan applicant and is accessing a loan application processing application. In particular, End User A is accessing and completing a loan application form. For example, the example loan application form of FIG. 7 is the loan application form that was defined by the example application graphical composition user interfaces of FIGS. 4 and 5. As shown in the example, End User A has input information and/or made selections with respect to each element of the loan application form. For example, End User A has input her name ("Alice Jones") in the "Full Name" field, input her social security number ("555-55-5555") in the "Social Security Number" field, input her address ("1234 Sesame Street, Cupertino Calif., 95014") in the "Mailing Address" field, selected the "Business" option in the "Loan Type" selection, input her credit score ("704") in the "Credit Score" field, and selected "$200,000" in the "Loan Amount" selection.

Figure 8:
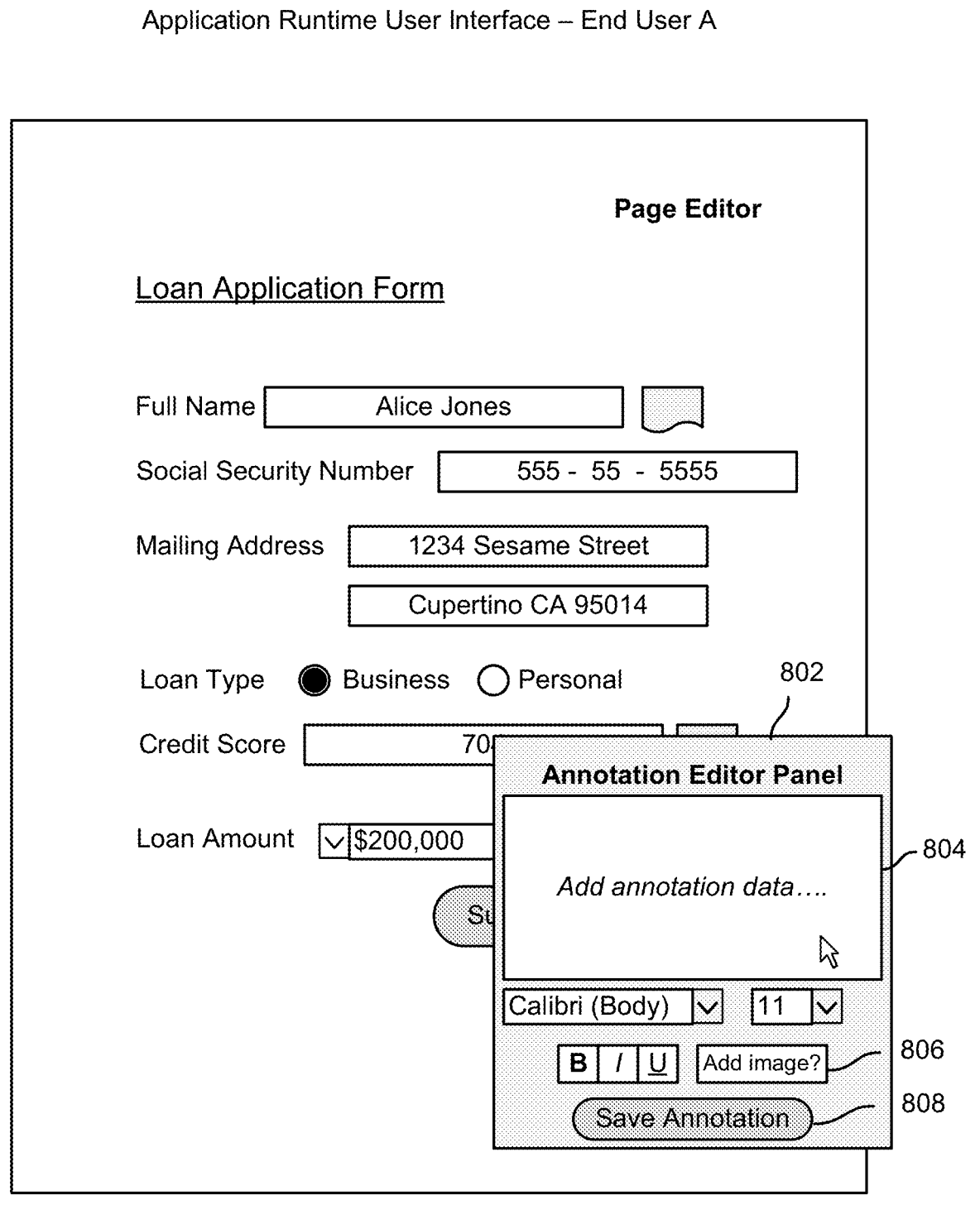

The loan application form of the example of FIG. 7 was defined to include an annotation capability with respect to the "Full Name" field and an annotation capability with respect to the "Credit Score" field. As a result, each of the "Full Name" field and the "Credit Score" field is presented with a corresponding annotation capability icon, 702 and 704, respectively. In the example of FIG. 7, End User A is able to see the annotation capability icons with respect to the "Full Name" and "Credit Score" fields because End User A is associated with an end user role with at least read and write permissions with respect to the annotation capability of the "Credit Score" field. As such, End User A has the option to write annotation data with respect to one or both of the "Full Name" and the "Credit Score" fields (but not the other page elements without the annotation capability icon). In the example, End User A would like to provide more context with respect to the credit score that she had input in the "Credit Score" field and is therefore currently selecting (e.g., using a cursor) annotation capability icon 704 associated with the "Credit Score" field. FIG. 8, below, describes an example in which after End User A has selected annotation capability icon 704 associated with the "Credit Score" field, an annotation editor panel is presented at the application runtime user interface that enables End User A to write/input annotation data associated with the "Credit Score" field.

FIG. 8 is a diagram illustrating an example application runtime user interface in an example embodiment of a system for capturing unstructured information in application pages. In various embodiments, application server 120 of application platform 110 of FIG. 1 may be configured to present an application runtime user interface, such as the one shown in FIG. 7. In some embodiments, at least a portion of process 600 of FIG. 6 is implemented using an application runtime user interface, such as the one shown in FIG. 8. The application runtime user interface of FIG. 8 is presented in response to the selection of an annotation capability icon presented next to the "Credit Score" field (e.g., as shown in FIG. 7). In response to the selection of an annotation capability icon presented next to the "Credit Score" field, annotation editor panel 802 is presented as a menu/interface that overlays the application runtime user interface. End User A may input annotation data in annotation editor panel 802 such as via input box 804. End User A may customize the text that is input in input box 804 using the font editing tools shown below input box 804. End User A may also insert an image into input box 804 by selecting "Add image?" button 806. When End User A has finished writing the annotation data to be associated with the "Credit Score" field, End User A may select "Save Annotation" button 808 to store the annotation data. After the annotation data is stored, annotation editor panel 802 becomes hidden. In some embodiments, after the input annotation data is stored, the annotation capability icon associated with the "Credit Score" field icon is modified to indicate that annotation data has been stored with respect to that element.

As described above, in some embodiments, the annotation data that is written with respect to an annotation capable element may be stored separately (e.g., in a separate data store) from the page data (e.g., the data that is input in page elements). As such, the annotation data that is written in annotation editor panel 802 with respect to the "Credit Score" field is stored, in some embodiments, separately from the information that is input into the "Credit Score" field. However, each set of annotation data is stored with a set of metadata that is usable to associate the set of annotation data with the corresponding application object instance, end user, application page, and page element, for example. FIG. 9, below, shows examples of the types of metadata that are stored with each set of annotation data.

FIG. 9 is a diagram illustrating an example of a table that is used to store annotation data in an example embodiment of a system for capturing unstructured information in application pages. In various embodiments, annotation data store 142 of repository 140 of FIG. 1 may be configured to store annotation data tables, such as the one shown in FIG. 9. As such in the example, each set of annotation data (e.g., text) is stored with its metadata as an entry in the annotation data table. In the example of FIG. 9, each set of annotation text is stored with the following metadata types: "annotation ID," "object ID," "element ID," "user ID," "public?," and "permission set." The "annotation ID" refers to an identifier assigned to the set of annotation text, the "object ID" refers to an identifier assigned to the object instance of the application in which the set of annotation text was received, the "element ID" refers to an identifier associated with the annotation capable element of a page from the object instance of the application with which the set of annotation text is associated, the "public?" value refers to whether any end user can view the set of annotation data (however, updating or deleting a public annotation data is still governed by a control access permission with respect to that annotation data), and the "permission set" refers to the set of control access permissions that were configured for the end user role associated with the end user identified by the corresponding user ID and/or configured for the corresponding annotation capable element identified by the corresponding element ID. An annotation data table such as the example shown in FIG. 9 can be queried and/or searched (independently from the page data and/or application object instance data).

In some embodiments, annotation data is stored, updated, deleted, and/or retrieved from an annotation data store (e.g., in a format such as the example shown in FIG. 9) using Rest Service-based annotation data actions. In some embodiments, page data (data input into page elements) (not shown in FIG. 9) is stored, updated, deleted, and/or retrieved in a separate page data store using Rest Service-based data actions.

Figure 10:
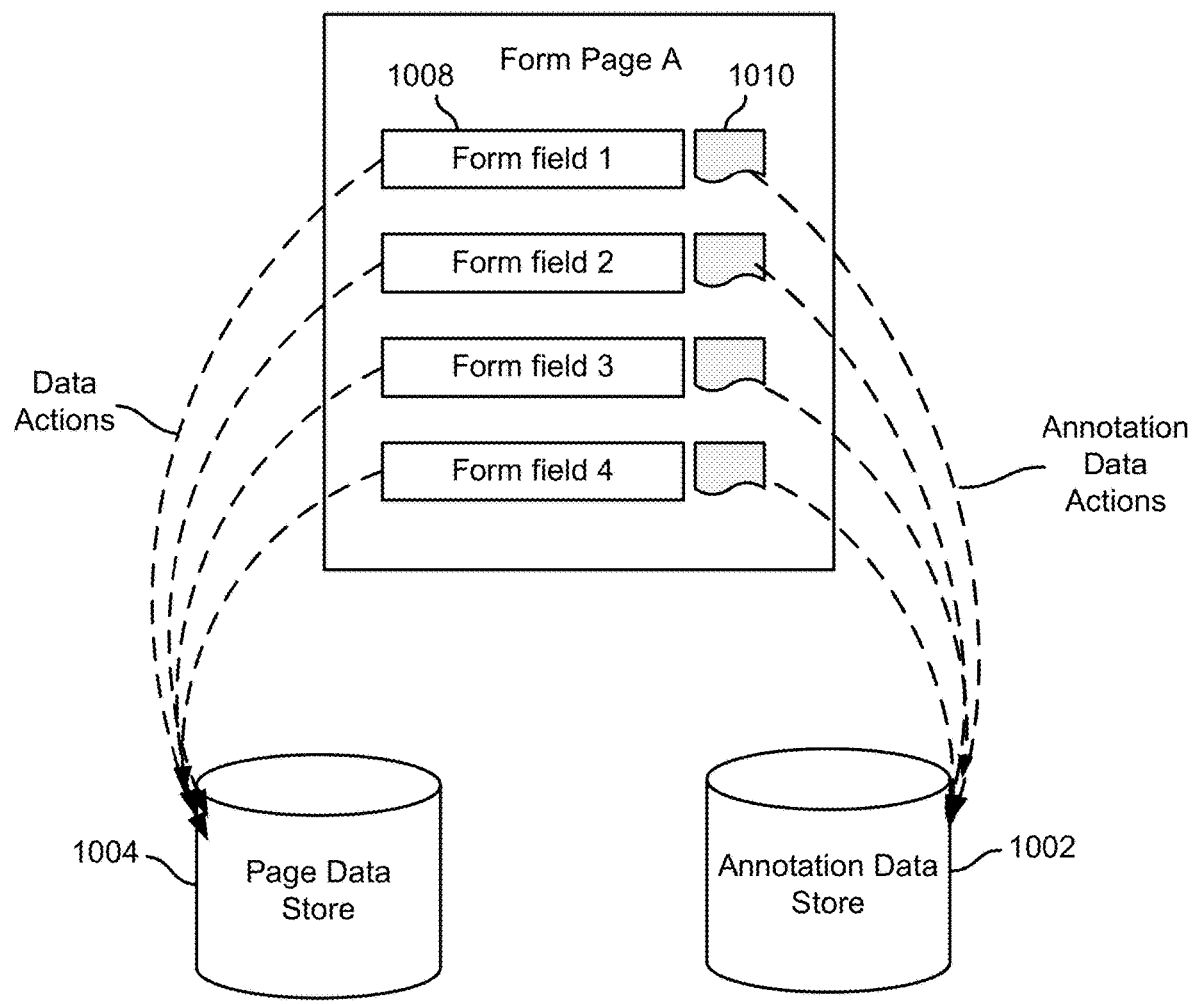
FIG. 10 is a diagram illustrating an example of an infrastructure that is used to access and store page data and annotation data during runtime in an example embodiment of a system for capturing unstructured information in application pages.

FIG. 10 is a diagram illustrating an example of an infrastructure that is used to access and store page data and annotation data during runtime in an example embodiment of a system for capturing unstructured information in application pages. In various embodiments, page data store 144 of repository 140 of FIG. 1 may be accessed during runtime in a manner similar to page data store 1004 as shown in FIG. 10. In various embodiments, annotation data store 142 of repository 140 of FIG. 1 may be accessed during runtime in a manner similar to annotation data store 1002 as shown in FIG. 10. As described above, in some embodiments, the data that is input into elements and/or selected with respect to elements (page data) is stored separately from the annotation data that is written with respect to at least some of the annotation capable elements. As shown in the example, the page data is stored at page data store 1004 and the annotation data is stored at annotation data store 1002. For example, the data that is input by an end user into form field 1, form field 2, form field 3, and form field 4 of Form Page A is stored at page data store 1004. The page data can be stored at or accessed from page data store 1004 during runtime of an object instance of an application using various Rest Service-based data actions.

As shown in the example, the annotation data is stored at annotation data store 1002 and the page data is stored at page data store 1004. Each of form field 1 (1008), form field 2, form field 3, and form field 4 of Form Page A was defined with an annotation capability and is therefore presented with a corresponding annotation capability icon (1010). For example, the annotation data that is input by an end user with respect to one or more of form field 1, form field 2, form field 3, and form field 4 of Form Page A is stored at annotation data store 1002. The annotation data can be stored at or accessed from annotation data store 1002 during runtime of an object instance of an application using various Rest Service-based annotation data actions. For example, each annotation data action may take one or more types of metadata (e.g., such as those shown in FIG. 9) stored with a set of annotation data as input parameter(s). The following are example Rest Service-based annotation data actions and their corresponding input parameters for storing and/or accessing annotation data during runtime:

"Read": the input parameters include "page ID" and "object ID." The "read" annotation data action reads a stored set of annotation data.

"Create New": the input parameters include "page ID," "object ID," "form field ID," "annotation text," and "is public?". The "create new" annotation data action stores a new set of annotation data (e.g., annotation text).

"Update": the input parameters include "page ID," "object ID," "form field ID," "annotation text," and "is public?". The "update" annotation data action modifies an existing set of annotation data (e.g., annotation text) with new annotation text.

"Delete": the input parameter includes "annotation ID." The "delete" annotation data action discards a stored set of annotation data (e.g., annotation text).

"Move": the input parameters include a new "form field ID" and "object ID." The "move" annotation data action stores a stored set of annotation data (e.g., annotation text) from one form field to the new form field at the same application page.

Figure 11:
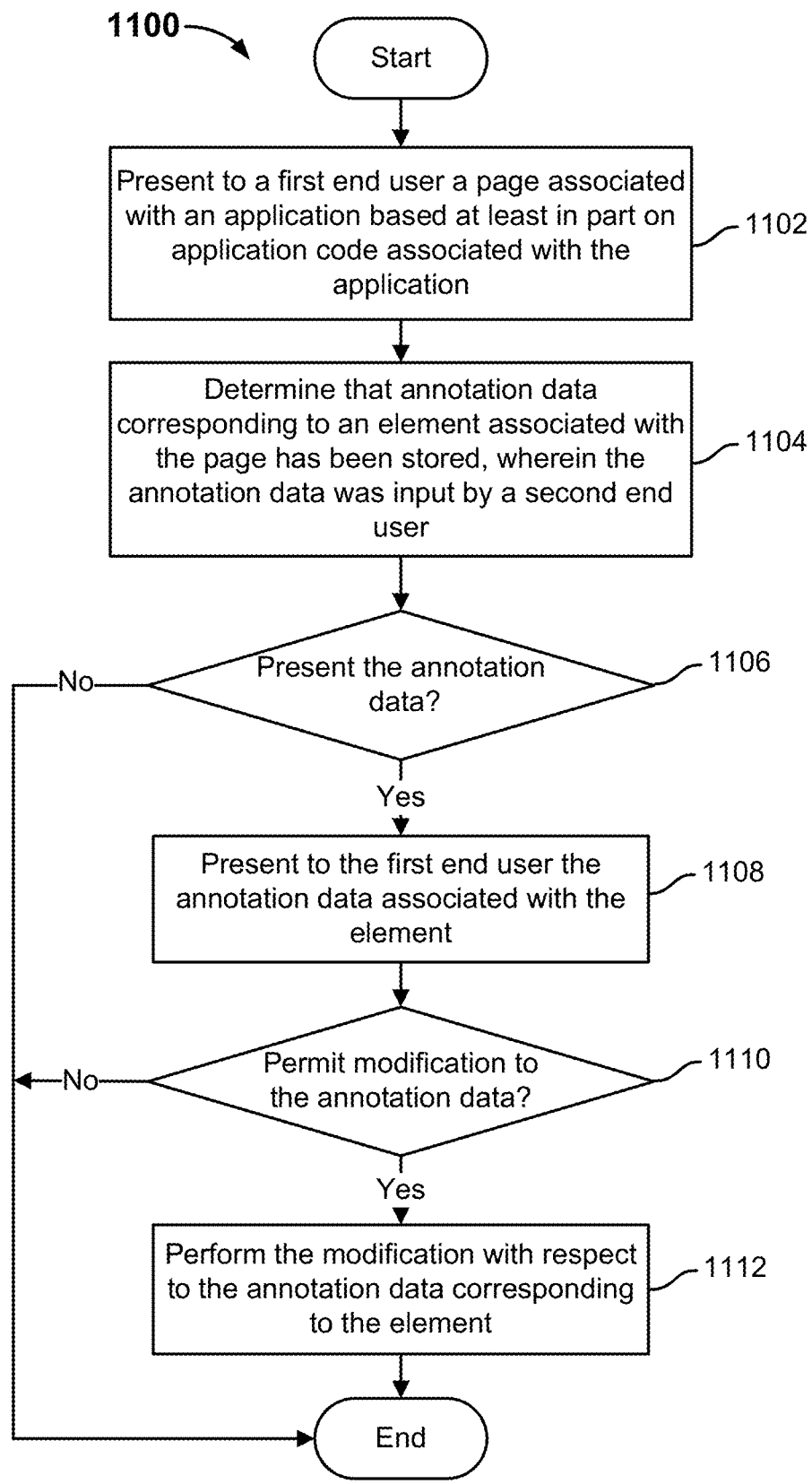
FIG. 11 is a flow chart illustrating an example embodiment for a process to display annotation data associated with an element in an application page.

FIG. 11 is a flow chart illustrating an example embodiment for a process to display annotation data associated with an element in an application page. In various embodiments, application platform 110 of FIG. 1 may be configured to implement process 1100 of FIG. 11. In some embodiments, specifically, application server 120 of application platform 110 of FIG. 1 may be configured to implement process 1100 of FIG. 11. In some embodiments, end user client 160 FIG. 1 may be configured to implement process 1100 of FIG. 11.

Process 1100 describes an example process of presenting, at runtime of an application, annotation data with respect to an annotation capable element in a page of the application page to a different end user than the end user who had submitted the annotation data.

At 1102, a page associated with an application with an application code is presented to a first end user based at least in part on the application code associated with the application. In some embodiments, the application was defined based at least in part on a developer tool such as developer tool 112 of FIG. 1. In some embodiments, the application code is executed to run an object instance of the application. The end user of the application may be directed to a particular page of the application. In some embodiments, the page comprises a form that is presented for the end user. A previous end user had completed the form page and had saved the completed form page. As shown in the example, the completed form page is now being presented to another, current end user (e.g., to review the completed form page).

At 1104, it is determined that annotation data corresponding to an element associated with the page has been stored, wherein the annotation data was input by a second end user. It is determined that the prior end user had submitted annotation data with respect to at least one annotation capable element of the form page.

At 1106, it is determined whether the annotation data corresponding to the element is to be presented to the first end user. In the event that the annotation data is to be presented to the first end user, control is transferred to 1108. Otherwise, in the event that the annotation data is not to be presented to the first end user, process 1100 ends. Whether the current end user is able to view the annotation data submitted by the earlier end user depends on an end user role associated with the current end user and a permission set configured with respect to the annotation capability associated with the element with which the annotation data is stored. In the event that the current end user is associated with an end user role that is configured to have a read permission with respect to the annotation capability associated with the element with which the annotation data is stored, then the annotation data may be presented for the current end user. But in the event that the current end user is associated with an end user role that is not configured to have a read permission with respect to the annotation capability associated with the element with which the annotation data is stored, then the annotation data may not be presented for the current end user.

At 1108, the annotation data associated with the element is presented to the first end user. In some embodiments, the annotation capable element with which the annotation data is stored is presented with an annotation capability icon and in response to the current end user's (who has been determined to be able to at least view the annotation data) selection of the annotation capability icon, the stored annotation data is displayed for the current end user.

At 1110, it is determined whether a modification submitted by the first end user with respect to the annotation data is permitted. In the event that the modification submitted by the first end user with respect to the annotation data is permitted, control is transferred to 1112. Otherwise, in the event that the modification submitted by the first end user with respect to the annotation data is not permitted, process 1100 ends. The current end user may wish to modify the annotation data submitted by the prior end user by updating the content of the annotation data, deleting the annotation data, and/or moving the annotation data to be associated with a different annotation capable element of the page, for example. Whether the current end user is able to modify the annotation data submitted by the earlier end user depends on an end user role associated with the current end user and a permission set configured with respect to the annotation capability associated with the element with which the annotation data is stored. In the event that the current end user is associated with an end user role that is configured to have a write and/or delete permission with respect to the annotation capability associated with the element with which the annotation data is stored, then the current end user may update and/or delete/move the annotation data, respectively. But in the event that the current end user is associated with an end user role that is not configured to have a write and/or delete permission with respect to the annotation capability associated with the element with which the annotation data is stored, then the current end user may not update and/or delete/move the annotation data, respectively.

At 1112, the modification with respect to the annotation data corresponding to the element is performed. If the current end user has the corresponding permission, an update, delete, and/or move modification with respect to the annotation data may be performed.

FIG. 12 is a diagram illustrating an example application runtime user interface in an example embodiment of a system for capturing unstructured information in application pages. In various embodiments, application server 120 of application platform 110 of FIG. 1 may be configured to present an application runtime user interface, such as the one shown in FIG. 12. In some embodiments, at least a portion of process 1100 of FIG. 11 is implemented using an application runtime user interface, such as the one shown in FIG. 12. The application runtime user interface of FIG. 12 can be generated by at least executing the application code generated based on the definition of the application. The application runtime user interface is used by an end user to access an object instance of an application during runtime. In some embodiments, the application runtime user interface of FIG. 12 is web-based and can be accessed by the end user at an end user client, such as end user client 160 of FIG. 1, over a network. For example, application page 164 presented in browser 162 at end user client 160 of FIG. 1 may be implemented using the example of FIG. 12. The example application page of FIG. 12 is presented to End User B. In the example, End User B comprises a loan officer and is accessing a loan application processing application. In particular, End User B is reviewing the loan application form completed by End User A (e.g., at the user interfaces shown in FIGS. 7 and 8). As shown in the example, the values that End User A had entered into the various page elements of the loan application form are visible to End User B. End user A had also submitted annotation data with respect to the "Credit Score" field. In the example, End User B had wished to view the annotation data with respect to the "Credit Score" field as submitted by End User A and therefore selected the annotation capability icon 1202 associated with the "Credit Score" field. In response to the End User B's selection of annotation capability icon 1202, the annotation data that was submitted by End User A with respect to the "Credit Score" field is presented in area 1204. In the example of FIG. 12, End User B is able to see the annotation data that was submitted by End User A with respect to the "Credit Score" field because End User B is associated with an end user role with at least a read permission with respect to the annotation capability of the "Credit Score" field. If End User B is also associated with a write permission, then End User B could submit his or her own annotation data or update the existing annotation data at the loan application form. If End User B is also associated with a delete permission, then End User B could delete the existing annotation data or move the existing annotation data at the loan application form.

In various embodiments, annotation capability is enabled with respect to specific elements of an application page during the design time of the application. Then, during runtime, the application code generated for the application is generated and annotation data may be received with respect to the annotation capable elements of the application page to provide additional information that was not necessarily solicited by the application page.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A system, comprising:
a processor configured to:
receive via an application composition interface a selection to add an annotation capability to an element associated with a page, wherein the page is associated with an application that is being defined at least in part via the application composition interface, wherein the element to which the capability is added is configured based at least in part on one or more permissions associated with an end user;
store an application definition for the application, wherein the application definition includes for the page a page definition data that reflects the selection; and
generate application code for the application programmatically, based at least in part on the application definition, wherein the application code is configured to include in the page an ability for the end user to input annotation data to be associated with the element, wherein the ability for the end user to input the annotation data is displayed to the end user based on the one or more permissions associated with the end user with respect to the application, and wherein the application code is configured such that in response to the end user inputting the annotation data, the annotation data is saved in association with information relating to the element.

2. The system of claim 1, wherein the element comprises one or more of the following: a field, a widget, a menu selection, and an action.

3. The system of claim 2, wherein the element is provided on a form that is displayed on the page.

4. The system of claim 1, wherein in response to the selection to add the annotation capability to the element, the processor is further configured to present an annotation configuration panel.

5. The system of claim 4, wherein the annotation configuration panel is configured to enable a developer user to configure an annotation attribute associated with the annotation capability associated with the element.

6. The system of claim 5, wherein the annotation attribute comprises a control access permission set associated with an end user role, wherein the application code when executed causes the permission set to be enforced with respect to any end user associated with the end user role.

7. The system of claim 6, wherein the control access permission set comprises one or more of: read, write, and delete.

8. The system of claim 1, wherein the application code when executed causes the annotation data associated with the element to be stored separately from data input in the element.

9. The system of claim 1, wherein the end user comprises a first end user and wherein the application code when executed causes:
the page to be presented to the first end user based at least in part on the page definition data;
an indication associated with the first end user to input the annotation data associated with the element associated with the page to be received;
an annotation editor panel to be presented; and
the annotation data to be received via the annotation editor panel.

10. The system of claim 9, wherein the indication to input annotation data associated with the element associated with the page comprises a selection associated with a visual indication associated with the annotation capability associated with the element.

11. The system of claim 9, wherein the application code when executed causes:
the page to be presented to a second end user based at least in part on the page definition data; and
a determination of whether the annotation data associated with the element is permitted to be presented to the second end user to be determined based at least in part on an end user role associated with the second end user and an annotation attribute associated with the annotation capability associated with the element.

12. The system of claim 9, wherein the application code when executed causes:
the page to be presented to a second end user based at least in part on the page definition data;
the annotation data associated with the element to be presented; and
a determination of whether the annotation data associated with the element is permitted to be modified by the second end user to be determined based at least in part on an end user role associated with the second end user and an annotation attribute associated with the annotation capability associated with the element.

13. The system of claim 9, wherein the application code when executed causes:
the page to be presented to a second end user based at least in part on the page definition data;
the annotation data associated with the element to be presented; and
a determination of whether the annotation data associated with the element is permitted to be deleted by the second end user to be determined based at least in part on an end user role associated with the second end user and an annotation attribute associated with the annotation capability associated with the element.

14. The system of claim 1, wherein the annotation data is stored in association with metadata that associates the annotation data with one or more of the page and the element associated with the page.

15. The system of claim 14, wherein a query can be performed on the annotation data.

16. The system of claim 14, wherein the metadata associated with the annotation data includes an identifier of the element associated with the page.

17. The system of claim 1, wherein saving the annotation data in association with information relating to the element comprises saving the annotation data in association with information that identifies the element.

18. The system of claim 1, wherein the annotation data is stored separately from other data provided on the page.

19. The system of claim 1, wherein the annotation data is stored in an annotation data table, and wherein a query pertaining to the annotation data can search the annotation data table independently of page data of the page.

20. A method, comprising:
receiving via an application composition interface a selection to add an annotation capability to an element associated with a page, wherein the page is associated with an application that is being defined at least in part via the application composition interface, wherein the element to which the capability is added is configured based at least in part on one or more permissions associated with an end user;
storing an application definition for the application, wherein the application definition includes for the page a page definition data that reflects the selection; and
generating, using a processor, application code for the application programmatically, based at least in part on the application definition, wherein the application code is configured to include in the page an ability for the end user to input annotation data to be associated with the element, wherein the ability for the end user to input the annotation data is displayed to the end user based on the one or more permissions associated with the end user with respect to the application, and wherein the application code is configured such that in response to the end user inputting the annotation data, the annotation data is saved in association with information relating to the element.

21. The method of claim 20, wherein in response to the selection to add the annotation capability to the element, the processor is further configured to present an annotation configuration panel.

22. The method of claim 21, wherein the annotation configuration panel is configured to enable a developer user to configure an annotation attribute associated with the annotation capability associated with the element.

23. The method of claim 22, wherein the annotation attribute comprises a control access permission set associated with an end user role, wherein the application code when executed causes the permission set to be enforced with respect to any end user associated with the end user role.

24. The method of claim 20, wherein the end user comprises a first end user and wherein the application code when executed causes:
the page to be presented to the first end user based at least in part on the page definition data;
an indication associated with the first end user to input the annotation data associated with the element associated with the page to be received;
an annotation editor panel to be presented; and
the annotation data to be received via the annotation editor panel.

25. The method of claim 24, wherein the indication to input annotation data associated with the element associated with the page comprises a selection associated with a visual indication associated with the annotation capability associated with the element.

26. The method of claim 24, wherein the application code when executed causes:
the page to be presented to a second end user based at least in part on the page definition data; and
a determination of whether the annotation data associated with the element is permitted to be presented to the second end user to be determined based at least in part on an end user role associated with the second end user and an annotation attribute associated with the annotation capability associated with the element.

27. The method of claim 24, wherein the application code when executed causes:
the page to be presented to a second end user based at least in part on the page definition data;
the annotation data associated with the element to be presented; and
a determination of whether the annotation data associated with the element is permitted to be modified by the second end user to be determined based at least in part on an end user role associated with the second end user and an annotation attribute associated with the annotation capability associated with the element.

28. A computer program product, the computer program product being embodied in a non-transitory computer readable storage medium and comprising computer instructions for:
receiving via an application composition interface a selection to add an annotation capability to an element associated with a page, wherein the page is associated with an application that is being defined at least in part via the application composition interface, wherein the element to which the capability is added is configured based at least in part on one or more permissions associated with an end user;
storing an application definition for the application, wherein the application definition includes for the page a page definition data that reflects the selection; and
generating application code for the application programmatically, based at least in part on the application definition, wherein the application code is configured to include in the page an ability for the end user to input annotation data to be associated with the element, wherein the ability for the end user to input the annotation data is displayed to the end user based on the one or more permissions associated with the end user with respect to the application, and wherein the application code is configured such that in response to the end user inputting the annotation data, the annotation data is saved in association with information relating to the element.

* * * * *